United States Patent [19]

Hansen et al.

[11] Patent Number: 4,773,205
[45] Date of Patent: Sep. 27, 1988

[54] ANTI-CLOGGING MEANS FOR BULK MATERIAL FLOW DUCT

[75] Inventors: Loren F. Hansen; Richard H. Florer; John E. Hicks, all of Lincoln, Nebr.

[73] Assignee: Outboard Marine Corporation, Waukegan, Ill.

[21] Appl. No.: 891,649

[22] Filed: Aug. 1, 1986

[51] Int. Cl.⁴ .......................................... A01D 34/70
[52] U.S. Cl. ........................................ 56/13.3; 56/202
[58] Field of Search ................. 56/13.3, 13.4, 202, 56/12.8

[56] References Cited

U.S. PATENT DOCUMENTS

| | | | |
|---|---|---|---|
| 584,968 | 6/1897 | Taylor | 406/93 |
| 713,787 | 11/1902 | McKone | 406/95 |
| 1,948,812 | 2/1934 | Williams | 406/61 |
| 2,026,291 | 12/1935 | Tirimacco | 56/13.3 |
| 2,219,011 | 10/1940 | Kidwell et al. | 406/94 |
| 2,762,184 | 9/1956 | Farrar | 56/13.4 |
| 2,807,925 | 10/1957 | Andrews | 56/13.3 |
| 2,990,660 | 7/1961 | Blume | 299/39 |
| 3,073,098 | 1/1963 | Farrar et al. | 56/13.3 |
| 3,091,906 | 6/1963 | Hall | 56/13.4 |
| 3,372,535 | 3/1968 | McCunn et al. | 56/13.3 |
| 3,464,191 | 9/1969 | Copley et al. | 56/13.3 |
| 3,537,755 | 11/1970 | Schmidt | 406/95 |
| 3,648,446 | 3/1972 | Haapoja et al. | 56/320.2 |
| 3,863,428 | 2/1975 | Baxter | 56/13.3 |
| 3,987,606 | 10/1976 | Evans | 56/202 |
| 4,087,955 | 5/1978 | Szymanis | 56/13.4 |
| 4,095,398 | 6/1978 | Aumann et al. | 56/13.4 |
| 4,106,272 | 8/1978 | Paterson et al. | 56/13.4 |
| 4,114,353 | 9/1978 | Ansbauch et al. | 56/13.3 |
| 4,271,659 | 6/1981 | McConnell | 56/12.3 |
| 4,281,946 | 8/1981 | Kanics | 406/95 |
| 4,488,395 | 12/1984 | Mack | 56/13.4 |

Primary Examiner—Paul J. Hirsch
Attorney, Agent, or Firm—Welsh & Katz, Ltd.

[57] ABSTRACT

An arrangement for preventing clogging of particulate material flowing through a curved section in a tubular duct or chute employs an air manifold operatively associated with the duct or chute and having an elongated discharge orifice positioned to discharge a wall of pressurized air along the internal concave duct surface so as to create positive laminar air flow along the curved surface and prevent stagnation and clogging of the particulate material. In a preferred embodiment, mutually cooperating auxiliary air discharge openings in the manifold and duct effect laminar air flow over other internal surface areas of the duct within the curved section. The anti-clogging arrangement finds particular application in grass mowers and the like wherein clippings tend to clog within curved sections of chutes through which the clippings pass to a receptacle.

16 Claims, 2 Drawing Sheets

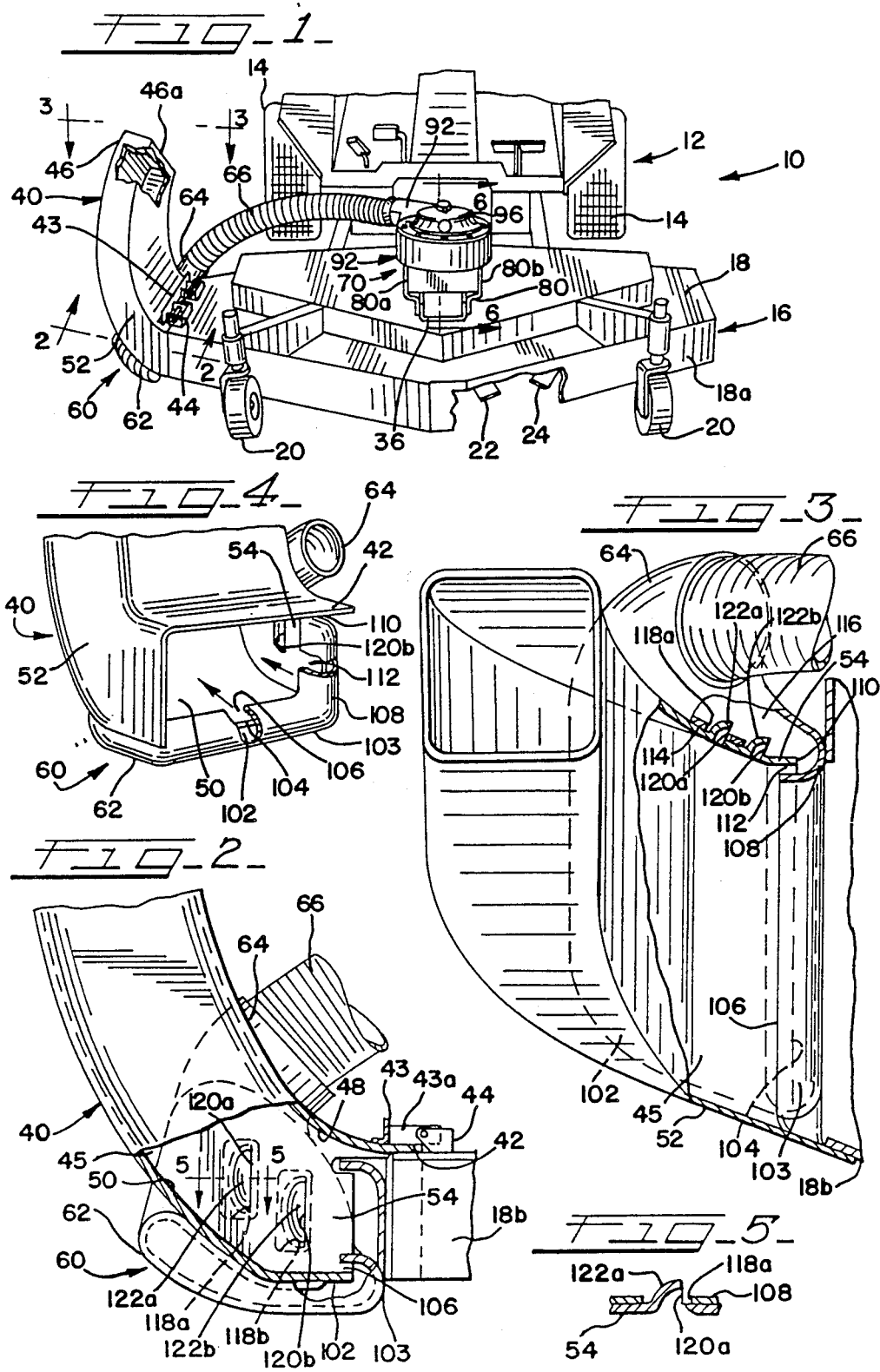

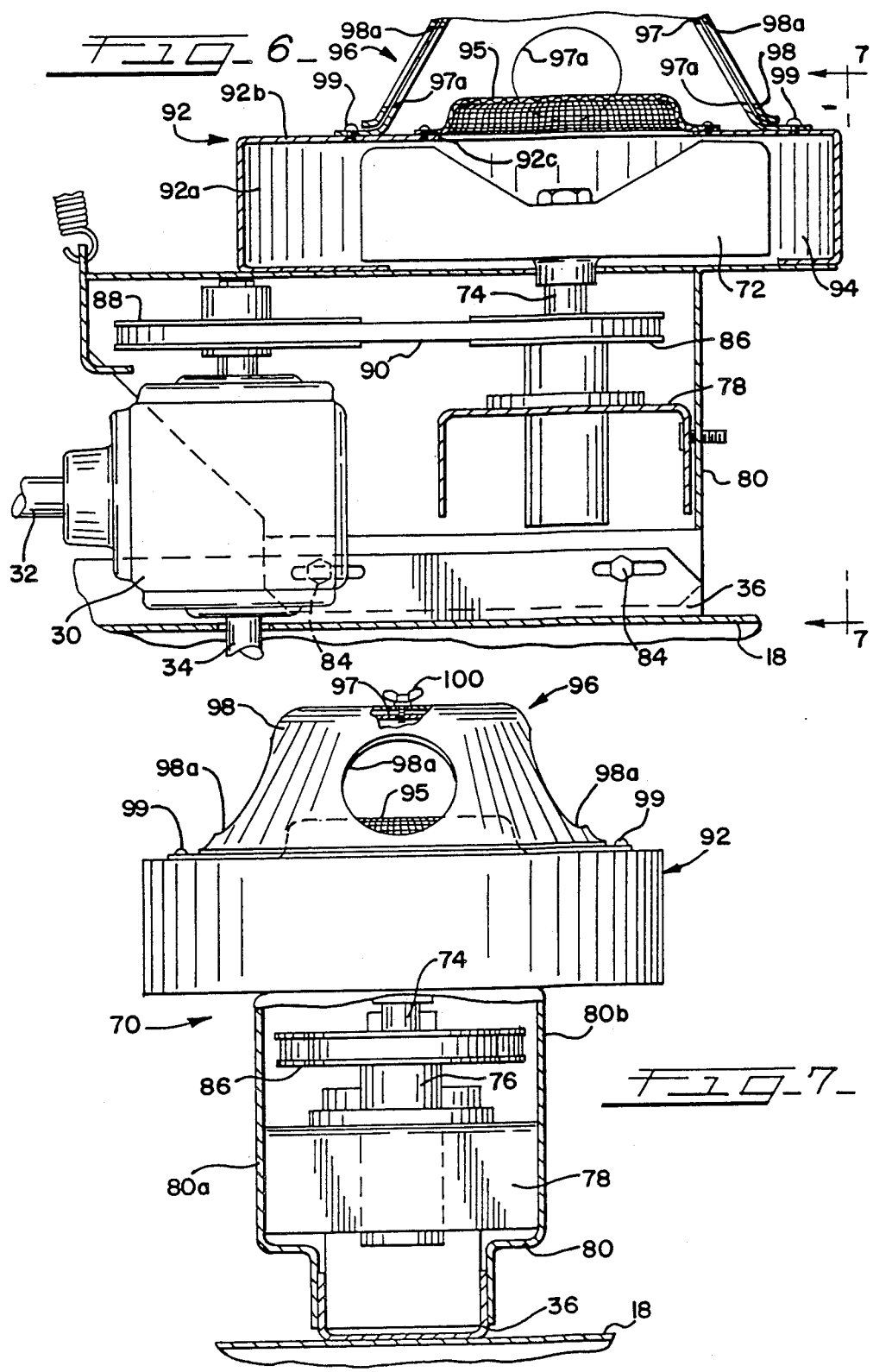

ANTI-CLOGGING MEANS FOR BULK MATERIAL FLOW DUCT

BACKGROUND OF THE INVENTION

The present invention relates generally to systems for effecting flow of bulk particulate material, and more particularly to an improved arrangement for maintaining efficient flow of bulk particulate material through a curved section of a duct or chute in a manner to prevent clogging.

A problem sometimes encountered in systems for conveying bulk particulate material through flow ducts or conduits having a curved section is that clogging may occur in the curved section due to the fact that a substantially zero velocity layer is formed over the internal duct surface of greatest radius. As a consequence, as particulate material, such as air entrained particulate material, passes through the curved duct section and impacts the internal concave curved surface, it tends to stagnate and may cause significant clogging which impedes flow through the duct. This problem is frequently encountered with commercial type grass mowers and the like which employ one or more rotary cutter blades and an associated shroud operative to both cut the underlying grass and effect air entrained passage of the cuttings to a chute or duct through which the cuttings pass to a receptacle. The chute or duct generally includes at least one curved section through which the clippings pass to an upstanding passage of sufficient height to drop the cuttings into the receptacle. As the air entrained grass clippings pass through the curved chute section and impact the internal concave surface over which the zero velocity layer is formed, the clippings tend to stagnate and cause clogging which impedes flow through the chute. This problem is particularly acute with damp or wet grass, and often requires interruption of mowing to clear the clogged chute or duct. The adverse effects of such clogging are thus readily apparent.

SUMMARY OF THE INVENTION

One of the primary objects of the present invention is to provide a novel system for preventing clogging within the curved section of a chute or duct system through which air entrained particulate material is caused to flow.

A more particular object of the present invention is to provide a novel anti-clogging arrangement for use with tubular flow ducts or chutes having curved sections through which air entrained particulate material is caused to flow, which arrangement employs a novel air manifold adapted for operative association with the flow duct or chute at the curved section thereof and having at least one orifice operative to discharge pressurized air over the internal surface of the duct so as to create a positive laminar air flow thereover and prevent clogging of particulate material within the curved section of the duct.

A feature of the anti-clogging arrangement of the present invention lies in the provision of an elongated discharge orifice in the manifold which is operative to discharge a wall of pressurized air over the internal curved chute surface of greatest radius so as to create a positive laminar flow over the curved chute surface and prevent stagnation and clogging of particulate material.

Another feature of the anti-clogging arrangement of the present invention lies in the provision of at least one secondary discharge opening in the manifold which communicates with the internal surface of the chute adjacent the curved section so as to create positive laminar air flow over the adjacent internal surface of the chute in addition to laminar flow over the internal curved surface.

In accordance with one embodiment of the invention, applied particularly to mowers for cutting grass and the like which include a curved tubular discharge chute or duct through which air entrained cuttings are caused to flow, an air manifold is operatively associated with the chute proximate the curved section thereof. The air manifold includes an elongated discharge orifice positioned to discharge a wall of pressurized air over the internal concave surface of the chute from an auxiliary supply of pressurized air. The air discharged from the manifold creates laminar air flow over the internal curved surface and prevents the formation of a zero velocity layer adjacent the concave surface of the chute so as to prevent stagnation and clogging of particulate material within the curved section of the chute.

Another feature of the anti-clogging arrangement of the present invention lies in the provision of auxiliary air pressure means operative to introduce positive air pressure into the air manifold, and having air inlet control means operable to enable the auxiliary air pressure to the manifold to be selectively varied so as to optimize the power requirements of the auxiliary air pressure means in relation to operating conditions.

Further objects and advantages of the invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is a fragmentary perspective view of a grass mower having an anti-clogging arrangement in accordance with the present invention;

FIG. 2 is a fragmentary elevational view, looking generally in the direction of the arrows through line 2—2 of FIG. 1, illustrating the clippings transfer chute and anti-clogging air manifold employed on the grass mower but with portions broken away for purposes of clarity;

FIG. 3 is a fragmentary plan view, looking generally in the direction of the arrows through line 3—3 of FIG. 1, illustrating the clippings transfer chute and associated air manifold with portions broken away for clarity;

FIG. 4 is a fragmentary perspective view illustrating the input end of the transfer chute and associated air manifold removed from the mower deck and with the chute mounting bracket removed from the chute;

FIG. 5 is a fragmentary sectional view taken substantially along line 5—5 of FIG. 2;

FIG. 6 is a fragmentary vertical sectional view taken substantially along line 6—6 of FIG. 1; and FIG. 7 is a fragmentary elevational view taken substantially along line 7—7 of FIG. 6 with portions broken away for clarity.

DESCRIPTION OF PREFERRED EMBODIMENT

Referring now to the drawings, and in particular to FIG. 1, an anti-clogging arrangement for preventing clogging of bulk particulate material within a duct or chute in accordance with the present invention is illustrated, by way of example, in operative association with a grass mower, indicated generally at 10. The grass mower 10 is of the commercial type and includes a tractor, a fragmentary portion of which is indicated generally at 12, having conventional power-driven wheels 14, steering (not shown) and speed and brake control pedals to enable selective movement of the tractor along a ground surface in a conventional manner. A mower deck 16, such as commercially available from the Outboard Marine Corporation, is operatively connected to the tractor 12 so as to be pushed forwardly of the tractor as it traverses a turf surface. The mower deck 16 defines a cutter assembly for the mower 10 and includes a shroud 18 having a peripheral downwardly depending sidewall 18a the lower free edge of which is maintained in adjustable spaced relation to the ground surface through a pair of support wheels 20 and the rearward connection of the mower deck to the tractor.

The shroud 18 of the mower deck houses a plurality of rotatable cutting blades, two of which are indicated at 22 and 24, which are supported such that the blades rotate in a plane parallel to the lower free edge of the shroud sidewall 18a a predetermined but adjustable distance from the ground surface. In the illustrated embodiment, blade drive means in the form of a speed reducer 30 (FIG. 6) having an input power shaft 32 from the tractor engine and an output drive shaft 34 is mounted on the upper surface of the shroud 18 through a generally U-shaped mounting channel 36. The output shaft 34 extends downwardly through the shroud 18 and carries a drive pulley (not shown) which cooperates through an endless drive belt with pulleys associated with each of the cutter blades so as to effect cutting of grass and the like when performing turf maintenance with the mower 10. The shroud 18 and associated cutter blades establish an under-deck baffle arrangement adapted to produce a positive lift and free-flow of air which effect passage of air entrained clippings to a rectangular side discharge opening 18b in the shroud 18.

In accordance with the illustrated embodiment, a grass clippings chute or duct, indicated generally at 40, is mounted on and carried by the shroud 18 of the mower deck such that a rectangular entry end 42 of the chute is releasably connected to the shroud peripherally of the shroud discharge opening 18b. The entry end 42 of the chute may be connected to the mower deck through a mounting bracket 43 affixed to the upper wall of the chute and having pairs of arms 43a adapted for pin connection with suitable brackets on the mower deck, such as indicated at 44 in FIGS. 1 and 2.

The chute 40 has an internal passage 45 which is of substantially rectangular transverse cross section throughout its length and receives air entrained clippings and the like from the mower deck. As shown in FIG. 1, the chute 40 extends generally upwardly from the mower deck 18 and terminates at an upper rectangular discharge end 46. A rectangular discharge opening in the chute is defined by a rearwardly downwardly inclined planar edge surface 46a which may be received within a grass clippings receptacle (not shown) carried by the tractor 12 such that air entrained clippings and the like passing upwardly through the chute are discharged into the receptacle. Such receptacles are of known design and enable periodic emptying independent of the chute 40.

In the operation of the mower as thus far described, air entrained grass clippings and the like are discharged through the discharge opening 18b of the mower deck shroud and pass upwardly through the chute 40 for discharge into a receptacle carried by the tractor 12. As the clippings pass through the chute, they pass through a curved section proximate the entry end 42 which is defined by oppositely facing generally uniformly curved internal convex and concave surfaces 48 and 50, respectively. The convex and concave surfaces 48 and 50 have their outer longitudinal edges formed integral with oppositely facing sidewalls 52 and 54 which lie in planes substantially normal to the curved surfaces 48 and 50 and thereby establish the aforementioned generally rectangular internal passage 45 through the chute.

It will be appreciated that as air flows through the chute 40 a substantially zero velocity air layer tends to be created along the concave surface 50 with the result that clippings passing through the chute tend to stagnate upon impacting the concave surface and may cause clogging so as to impede flow of clippings through the chute. This problem is particularly acute with wet or damp grass clippings passing through the chute.

In accordance with the present invention, anticlogging means, indicated generally at 60, is operatively associated with the chute 40 in a manner to effect discharge of pressurized air along selected ones of the internal surfaces of the chute, and particularly along the concave surface 50 and adajcent wall 54, so as to prevent clogging of cuttings within the curved section of the chute. The anti-clogging means 60 includes an air manifold 62 which is mounted on the chute 40 proximate the lower curved section thereof and extends generally transverse to the primary flow path through the chute. The air manifold 62 has a generally circular inlet port 64 adapted to have a suitable air flow duct or supply tube 66 connected thereto. The end of the air duct 66 opposite the manifold inlet 64 is connected to auxiliary air pressure means, indicated generally at 70.

In the illustrated embodiment, the auxiliary air pressure means 70 includes an air pump having a centrifugal fan wheel 72 which is mounted on the upper end of a substantially vertically disposed drive shaft 76, the lower end of which is rotatably supported within a suitable bearing housing 76. The bearing housing 76 is affixed to a support bracket 78 which extends between upstanding sidewalls 80a and 80b of a sheet metal housing 80. The housing 80 is adjustably mounted on the mounting channel 36, as through screws 84 and associated elongated slots, so as to enable selective positioning of a driven pulley 86 on the drive shaft 74 relative to a drive pulley 88 mounted on the upwardly extending end of the speed reducer output shaft 34, thereby enabling selective tensioning of a drive belt 90.

A shroud 92 is mounted on the housing 80 so as to encircle the centrifugal fan wheel 72 and establish a circumferential air passage 94 which communicates with a substantially tangential air pressure discharge port 92a. The shroud 92 has a generally planar upper wall 92b having a circular air intake opening 92c centrally overlying the fan blade 72 so as to facilitate air being drawn into the shroud 92 by the fan blade during rotation thereof. A wire screen 95 is preferably suitably secured to the upper wall 92b of shroud 92 so as to overlie the air intake opening 92c and prevent undesirable debris from entering the shroud. Air inlet control means, indicated generally at 96, are operatively associated with the auxiliary air pressure means 70 to enable selective control or varying of the air pressure flow to the manifold 62. The air inlet control means 96 includes a pair of generally similar inverted bowl-shaped members 97 and 98 which are supported in nested relation on the shroud 92. The lower cover member 97 is fixed to the shroud 92 through a plurality of circumferentially spaced screws 99 so as to centrally overlie the air intake opening 92c in the shroud. The upper cover member 98 nests on the lower cover member 97 and is releasably retained thereon through a wing-type thumb screw 100 which has threaded connection to the cover member 97 and defines a rotational axis about which the upper cover member may be rotated relative to the lower cover member.

Each of the lower and upper cover members 97 and 98 has a plurality of circular air intake ports or openings, there being four equally spaced openings in the illustrated embodiment as indicated at 97a and 98a, respectively, in FIGS. 6 and 7. The air intake ports 97a, 98a are sized and spaced about the cover members so as to enable the upper cover member to be moved between a position wherein the respective air intake ports of the cover members are aligned for maximum air input, and rotational positions partially or completely covering the intake ports 97a to effect partial or substantially no air input. In this manner, the upper cover member 98 may be rotated relative to the lower cover member 97 to enable selective varying of the air input into the fan wheel 72 and thereby allow the operator to match the auxiliary air flow into the manifold 60, and therefore the power requirements, to the grass conditions. The end of the air duct 66 opposite the manifold inlet port 64 is connected to the shroud discharge port 92a such that auxiliary air pressure created by the centrifugal fan wheel 72 is passed into the manifold 60.

Referring again to FIGS. 2-4, taken in conjunction with FIG. 1, the manifold 62 has an internal air plenum chamber 102 which communicates with the inlet port 64 and extends generally transversely of the lower curved section of the chute 40. The manifold 62 has a first upwardly extending curvilinear portion 103 which extends substantially the full transverse width of the chute or duct 40 and is received within a transverse rectangular recess or opening 104 in the chute adjacent the upstream or entry end of the concave surface 50. An elongated rectangular air discharge opening 106, termed the primary discharge orifice of the manifold, is formed along the length of the curvilinear portion 103 of manifold 62 so as to extend substantially the full transverse width of the internal concave surface 50. The discharge orifice 106 communicates with the plenum chamber 102 and is positioned to discharge a moving wall of pressurized air onto the concave surface 50 at its upstream end and along substantially its full width so as to create a positive laminar air flow layer over the concave surface upon the introduction of auxiliary pressurized air into the manifold inlet port 64 from the auxiliary air pressure means 70. This laminar air layer substantially prevents stagnation of clippings passing over the concave curved chute or duct surface.

As illustrated in FIGS. 3 and 4, the manifold 62 preferably has a second curvilinear portion 108 which is formed contiguous to the curvilinear portion 103 and at generally right angles thereto. The curvilinear portion 108 is configured to extend within a recess 110 in the chute sidewall 54 (FIG. 3), and defines an elongated discharge orifice or opening 112 which communicates with the plenum chamber 102 and effects discharge of a moving wall of pressurized air along substantially the full height of the internal surface of sidewall 54. In this manner, the air discharge orifice 112, which may be termed the complimentary discharge orifice, causes a positive laminar air flow layer to be created along the internal surface of sidewall 54 in similar fashion to air discharge from the discharge opening 106, thereby cooperating with discharge opening 106 to prevent stagnation and clogging of clippings within the lower curved section of the chute 40.

To further assist in effecting flow of pressurized air along the interior surface of the sidewall 54 so as to assure a positive laminar flow therealong within the lower curved section of the chute, the manifold 62 has a generally planar wall 114 adapted to abut the external surface of the chute sidewall 54 when the manifold is affixed thereto as illustrated in FIG. 3. In the illustrated embodiment, the wall 114 forms one boundary of an auxiliary air intake chamber 116 which communicates with the transversely extending portion of the plenum chamber 102. The manifold wall 114 has a pair of rectangular secondary air discharge openings or orifices 118a and 118b formed therethrough which are positioned to cooperate with air inlet openings 120a and 120b, respectively, formed in the chute sidewall 54. The sidewall openings 120a and 120b are defined by louvers 122a and 122b, respectively, which are formed generally as quantrants of a sphere and extend outwardly from the plane of sidewall 54 as illustrated by the louver 122a in FIG. 5. The louvers 122a and 122b serve to scoop auxiliary air pressure passing or migrating along the manifold wall 114 within the manifold chamber 116 and cause the auxiliary air pressure to pass through the openings 120a and 120b into the chute or duct at an angular relationship of approximately 45° relative to the sidewall 54 whereafter the incoming air flows along the adjacent inner surface of sidewall 54 and reinforces the laminar flow layer along the inner sidewall surface created by air discharge from orifice 112. While a pair of the secondary discharge openings 118a and 118b are provided in the manifold wall 116 for mutual cooperation with openings 120a and 120b and louvers 122a and 122b, respectively, formed in the sidewall 54 of the chute to effect secondary air flow into the chute, it will be appreciated that a single secondary discharge opening, or more than two such openings, may be provided in the manifold and chute to introduce auxiliary pressurized air into the curved section of the chute and assist in creating laminar flow over the inner surface of the corresponding chute wall.

In operation, rotary driving of the cutting blades 22 and 24 causes the centrifugal fan wheel 72 to rotate. Assuming a full open condition of the air inlet ports or openings 97a and 98a in the air inlet control means 96, auxiliary air pressure is discharged from the discharge port 92a of shroud 92 and passes to the manifold 60 through the air duct 66. Air entering the manifold 60 flows through the air plenum chamber 102 transversely of the curved section of the chute 40 and is discharged through the elongated discharge orifice 106 so as to cause a wall of pressurized auxiliary air to flow along the internal concave surface 50 of the chute and thereby establish laminar air flow thereover. Simultaneously, auxiliary air pressure is discharged into the chute from the elongated orifice 112 and the louvered openings 120a and 120b in the chute sidewall 54 so as to effect laminar air flow along the inner surface of the sidewall 54 within the curved section of the chute.

With grass clippings and the like being discharged from the discharge opening 18b of the mower deck shroud 18, any clippings entering the lower curved section of the chute which might otherwise impact the concave surface 50 and stagnate thereagainst are carried along the chute to its upper discharge end 46 by the laminar air layer created by the manifold 62. Similarly, any clippings and the like which might otherwise impact the chute sidewall surface 54 and stagnate within the curved section of the chute are carried upwardly within the chute by the auxiliary laminar air layer discharged into the chute from the manifold discharge orifice 112 and the louvered openings 120a and 120b.

While the anti-clogging means in accordance with the invention has been illustrated in conjunction with a clippings discharge chute or duct on a mower, it will be appreciated that the invention may also be utilized in conjunction with other material handling systems employing tubular flow chutes or ducts through which bulk particulate material is conveyed. As aforedescribed, the invention finds particular application with tubular flow ducts having curved surface sections over which zero velocity layers tend to be created such that particulate material impacting the corresponding duct surface stagnates and impedes flow through the duct. The illustrated embodiment of the invention finds particular application with bulk particulate material flow ducts of substantially rectangular transverse cross-sectional configuration wherein the curved section of the duct is defined in part by a relatively broad uniformly curved concave surface, and wherein a wall of pressurized air discharged across substantially the full width of the concave surface is utilized to establish a laminar flow layer which prevents stagnation of the particulate material against the concave surface.

While a preferred embodiment of the present invention has been illustrated and described, it will be understood that changes and modifications may be made therein without departing from the invention in its broader aspects. Various features of the invention are defined in the following claims.

What is claimed is:

1. In a mower for cutting grass and the like which includes a cutter blade assembly and associated shroud adapted to be moved along a ground surface to cut grass and the like and effect air entrained movement of the cuttings to a discharge port, and a chute having an interior and an entry end with a lower edge margin, said entry end being connected to said discharge port and being operative to guide the cuttings through at least one curved chute section to a location spaced from said discharge port, said curved chute section having an upstream end, and an interior surface, a portion of said interior surface having a greatest amount of curvature; the combination therewith comprising an air manifold operatively associated with said chute and having an inlet port and portion with a primary discharge orifice, said manifold portion projecting into said chute and over said lower edge margin and being positioned therein such that said primary discharge orifice communicates with the interior of said chute proximate said upstream end of said curved chute section, means for creating a positive auxiliary air pressure during operation of the mower, and conduit means interconnecting said auxiliary air pressure means to said manifold inlet port in a manner to effect discharge of pressurized air from said primary discharge orifice, said air manifold being configured to direct a moving wall of pressurized air from said primary discharge orifice over said lower edge margin of said entry end and along said interior surface of said curved section in closely adjacent relation to said surface of greatest amount of curvature so as to prevent clogging of cuttings within said curved section of said chute.

2. A mower as defined in claim 1 wherein said chute is of generally rectangular transverse crosssectional configuration at said curved section thereof, said primary discharge orifice of said manifold being positioned proximate the upstream end of the surface of largest radius through said curved section and being adapted to discharge a moving wall of pressurized air onto substantially the full transverse width of the internal surface of largest radius so as to create a positive laminar flow layer thereover during operation of the mower.

3. A mower as defined in claim 1 wherein said manifold has a secondary discharge orifice communicating with said chute so as to discharge pressurized air into said chute and create laminar air flow over an internal surface area discrete from the area over which air pressure from said primary discharge orifice is discharged.

4. A mower as defined in claim 1 wherein said means for creating a positive auxiliary air pressure comprises an air pump.

5. A mower as defined in claim 1 wherein said manifold is directly mounted on said chute adjacent said curved section thereof, said manifold having a portion thereof projecting through a mutually cooperative opening in said chute and defining an elongated discharge orifice operative to discharge a moving wall of pressurized air over the internal curved surface of largest radius and create a positive laminar flow layer thereover.

6. A mower as defined in claim 1 wherein said chute has a substantially rectangular transverse crosssection at said curved section thereof, said primary discharge orifice being defined by an elongated discharge opening in said manifold, and said manifold being positioned such that said elongated discharge opening extends substantially the full width of the curved surface of largest radius and substantially transverse to the direction of movement of air entrained cuttings passing through the chute.

7. A mower as defined in claim 3 wherein said chute is of generally rectangular transverse crosssectional configuration at said curved section so as to define a concave curved interior wall surface bounded by generally planar sidewall surfaces, at least one of said sidewalls having an opening therein communicating with said air manifold in a manner to receive pressurized air inwardly through said sidewall opening.

8. A mower as defined in claim 7 wherein said opening in said sidewall is defined by a louver operative to cause pressurized air to pass inwardly of said chute adjacent the corresponding interior wall surface so as to create positive laminar air flow along said interior wall surface.

9. A mower as defined in claim 7 wherein said at least one sidewall of said chute includes a pair of air flow openings therethrough communicating with said air manifold, and louver means operatively associated with each of said air flow openings in a manner to cause auxiliary air pressure to pass inwardly through said air flow openings along the corresponding interior wall surface so as to create positive laminar air flow adjacent said corresponding wall surface.

10. A mower as defined in claim 2 wherein said curved section of said chute has a concave internal surface bounded by opposing internal sidewall surfaces, said air manifold having a complimentary discharge orifice operative to effect discharge of pressurized air over one of said internal sidewall surfaces so as to create positive laminar air flow thereover.

11. A mower as defined in claim 4 wherein said cutter blade assembly includes at least one cutter blade, and drive means operatively associated with said cutter blade in a manner to effect driving rotation thereof, said air pump being operatively connected to said drive means so as to be driven thereby.

12. A mower as defined in claim 4 wherein said air pump includes a centrifugal fan wheel driven by said drive means, a shroud operatively associated with said fan wheel and defining an air inlet port and an air pressure outlet port, said conduit means interconnecting said air pressure outlet port to said manifold inlet port.

13. A mower as defined in claim 12 including air inlet control means operatively associated with said shroud air inlet port and adapted to enable selective control of air introduced into said inlet port.

14. A mower as defined in claim 13 wherein said air inlet control means includes a pair of similarly shaped cover members each of which has at least one air entry opening therethrough, said cover members being relatively movable to selectively control the opening through which air may pass to said shroud inlet port.

15. In a mower for cutting grass and the like which includes a cutter blade assembly adapted to be moved along a ground surface to cut grass and the like and effect air entrained movement of the cuttings to a discharge port, and a tubular duct having an interior and an entry end with a lower edge margin, said entry end being connected to said discharge port and being operative to guide the cuttings through at least one curved duct section to a location spaced from said discharge port, said curved duct section having an upstream end and an interior surface, a portion of said interior surface having a greatest amount of curvature; the combination therewith comprising an air manifold operatively associated with said duct and having an inlet port and a portion with a discharge orificce, said manifold being positioned such that said portion with said discharge orifice projects into the interior of said duct over said lower edge margin and proximate said upstream end of said curved duct section, means for creating a positive auxiliary air pressure during operation of the mower, and conduit means interconnecting said auxiliary air pressure means to said manifold inlet port in a manner to effect discharge of pressurized air from said discharge orifice over said lower edge margin of said entry end and along said interior curved surface in closely adjacent relation therewith in the direction of said portion having a greatest amount of curvature to prevent clogging of cuttings within said curved section of said duct.

16. In a mower for cutting grass and the like which includes a cutter blade assembly and associated shroud adapted to be moved along a ground surface to cut grass and the like and effect air entrained movement of the cuttings to a discharge port, and a chute having a generally rectangular transverse cross-sectional configuration, an interior and an entry end with a lower edge margin, said entry end being connected to said discharge port and being operative to guide the cuttings through at least one curved chute section to a location spaced from said discharge port, said curved chute section having an upstream end, a concave internal surface bounded by opposing internal sidewall surfaces and a portion of said internal surface having a greatest amount of curvature; the combination therewith comprising an air manifold operatively associated with said chute, said, manifold having an inlet port and a portion with a discharge orifice, said portion with said discharge orifice being positioned in close proximity to said entry end of said chute such that said discharge orifice communicates with the interior of said chute proximate said upstream end of said curved chute section, means for creating a positive auxilliary air pressure during operation of the mower, and conduit means interconnecting said auxilliary air pressure means to said manifold inlet port in a manner to effect the discharge of pressurized air from said discharge orifice, said air manifold being configured to direct a moving wall of pressurized air from said discharge orifice over said lower edge margin of said entry end, over at least one of said internal sidewall surfaces and along said interior surface of said curved section in closely adjacent relation to said surface of greatest amount of curvature so as to create positive air flow thereover and thus prevent clogging of cutting within said curved section of said chute.

* * * * *

UNITED STATES PATENT AND TRADEMARK OFFICE
CERTIFICATE OF CORRECTION

PATENT NO. : 4,773,205
DATED : September 27, 1988
INVENTOR(S) : Hansen et al.

It is certified that error appears in the above-identified patent and that said Letters Patent is hereby corrected as shown below:

Claim 2, Line 2, change "crosssectional" to --cross-sectional--;

Claim 6, Line 2, change "crosssection" to --cross-section--;

Claim 7, Line 2, change "crosssectional" to --cross-sectional--;

Claim 16, Line 17, change ", said," to --, said--.

Signed and Sealed this

Eleventh Day of April, 1989

Attest:

DONALD J. QUIGG

Attesting Officer

Commissioner of Patents and Trademarks